United States Patent
Sarkar et al.

(10) Patent No.: US 12,289,303 B2
(45) Date of Patent: Apr. 29, 2025

(54) AUTOMATION OF WEB APPLICATION SECURITY

(71) Applicant: BMC Software, Inc., Houston, TX (US)

(72) Inventors: Subhasish Sarkar, Pune (IN); Eric Anderson, Friendswood, TX (US)

(73) Assignee: BMC Software, Inc., Houston, TX (US)

( * ) Notice: Subject to any disclaimer, the term of this patent is extended or adjusted under 35 U.S.C. 154(b) by 294 days.

(21) Appl. No.: 17/810,215

(22) Filed: Jun. 30, 2022

(65) Prior Publication Data

US 2024/0007455 A1 Jan. 4, 2024

(51) Int. Cl.
*H04L 9/40* (2022.01)
*G06F 9/451* (2018.01)

(52) U.S. Cl.
CPC ............ *H04L 63/083* (2013.01); *G06F 9/451* (2018.02); *H04L 2463/082* (2013.01)

(58) Field of Classification Search
CPC .. H04L 63/083; H04L 2463/082; G06F 9/451
See application file for complete search history.

(56) References Cited

U.S. PATENT DOCUMENTS

| | | | |
|---|---|---|---|
| 9,305,160 B2 | 4/2016 | Adler et al. | |
| 9,785,766 B2 | 10/2017 | Leckey et al. | |
| 10,200,359 B1 | 2/2019 | Sokolov et al. | |
| 10,331,879 B1 | 6/2019 | Jiang et al. | |
| 2013/0014236 A1* | 1/2013 | Bingell | H04L 63/0846 726/6 |
| 2017/0011214 A1* | 1/2017 | Cavanagh | H04L 63/0846 |
| 2018/0260557 A1* | 9/2018 | Rockwell | H04L 9/3226 |
| 2020/0410086 A1 | 12/2020 | Harmon | |
| 2021/0073373 A1 | 3/2021 | Siegrist | |

OTHER PUBLICATIONS

"The Team Password Manager API", [retrieved on Aug. 13, 2024], Retrieved from <https://teampasswordmanager.com/docs/api/> (Year: 2021).*
"RPA Security Best Practices Managing Identities and Privileges", [retrieved on Aug. 13, 2024], Retrieved from <https://www.beyondtrust.com/blog/entry/managing-identities-and-privileges-for-robotic-process-automation-rpa> (Year: 2019).*

(Continued)

*Primary Examiner* — Sangseok Park
(74) *Attorney, Agent, or Firm* — Brake Hughes Bellermann LLP (57) ABSTRACT

Described systems and techniques determine a password change trigger for a password for an account, and access a connection store storing a plurality of password models. Each password model may include at least one password requirement and at least one password change procedure. Based on the password change trigger and from the plurality of password models, a selected password model for the password and the account may be selected. The account may be accessed using at least one selected password change procedure of the selected password model, and the password may be updated in accordance with at least one selected password requirement of the selected password model.

17 Claims, 4 Drawing Sheets

(56) References Cited

OTHER PUBLICATIONS

"Software token", from Wikipedia, [retrieved on Aug. 14, 2024], Retrieved from <https://en.wikipedia.org/w/index.php?title=Software_token&oldid=1076662164> (Year: 2022).*
C. Griffith: "Password vaults and authenticators are powerful security tools," The Australian (Online), Apr. 13, 2021, 4 pages.
Google Chrome: "Manage Passwords," available online at <https://support.google.com/chrome/answer/95606?hl=en&co=GENIE.Platform%3DDesktop>, 2008, 3 pages.
LastPass: "What is LasPass and why should I use it?", available online at <https://support.lastpass.com/help/what-is-lastpass-and-why-should-i-use-it-Ip010067>, Aug. 22, 2008, 1 page.

* cited by examiner

AUTOMATION OF WEB APPLICATION SECURITY

TECHNICAL FIELD

This description relates to ensuring web application security.

BACKGROUND

Username/password combinations are commonly used to authenticate users and provide access to network resources. Unfortunately, such password-based authentication techniques remain susceptible to various types of security breaches.

For example, many users have a tendency to use a single password to access many different websites. As an example, a type of cyberattack known as credential stuffing exploits this tendency by using automated techniques to submit an illicitly obtained password to access many different websites, and thereby gain access to at least some percentage of the websites for which the password has been reused.

In order to avoid credential stuffing and other password-related types of cyberattacks, users are often encouraged to use unique passwords. In addition, many websites enforce password requirements with respect to the structure and content of allowed passwords. Further, many websites require users to periodically update their passwords.

Because these and related techniques are highly inconvenient for users resulting in a reluctance to adopt, such techniques have not been successfully or universally adopted and have therefore failed to provide necessary levels of security. As a result, network resource providers continue to suffer from various types of liability associated with data breaches, and network resource users remain vulnerable to the loss of confidential data.

SUMMARY

According to some general aspects, a computer program product may be tangibly embodied on a non-transitory computer-readable storage medium and may include instructions. When executed by at least one computing device, the instructions may be configured to cause the at least one computing device to determine a password change trigger for a password for an account and access a connection store storing a plurality of password models, each password model including at least one password requirement and at least one password change procedure. When executed by at least one computing device, the instructions may be configured to cause the at least one computing device to select, based on the password change trigger and from the plurality of password models, a selected password model for the password and the account. When executed by at least one computing device, the instructions may be configured to cause the at least one computing device to access the account using at least one selected password change procedure of the selected password model and update the password in accordance with at least one selected password requirement of the selected password model.

According to other general aspects, a computer-implemented method may perform the instructions of the computer program product. According to other general aspects, a system, such as a mainframe system or a distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Described systems and techniques enable, for example, improved web application security for both providers and users, in a manner that is convenient and reliable. By enabling users to configure password changes across many different accounts in a safe, automated manner, the described techniques prevent credential stuffing and other password-related cyberattacks. Conventional solutions, in contrast, may rely on user involvement, commitment, and participation to unreasonable and unrealistic extents, and may result in unacceptable levels of vulnerability to loss of confidential data.

As referenced above, cyber security is a significant threat to corporations, governments, and other entities, as well as to individuals. Millions of individual web applications require a similar "username/password" for user authentication. For such web applications, the username is often based on an email address of the user, while passwords may have many different requirements and constraints, which may vary by account. For example, various websites may have requirements with respect to a minimum or maximum number of characters in a password, or with respect to a number of capital letters and/or special characters that may or must be included. In other examples, passwords may be restricted from containing repeatable or recognizable patterns, or any personal information (such as a user's birthday or address).

A user may interact with dozens of user accounts so that it is virtually impossible for a user to remember all corresponding passwords. In addition, many websites and other accounts require user passwords to be updated on a regular basis, e.g., every three months. Such requirements only exacerbate the difficulties experienced by users in maintaining password security. Therefore, many website owners and other account providers are hesitant to create and enforce stringent password policies, because doing so may undesirably reduce user traffic, reduce productivity, and negatively impact the organization's business.

Existing products enable a degree of automation with respect to maintaining password security. For example, conventional password vaults may be configured to auto-generate and store a password for a particular website. Then, when a user wishes to access that website, the password vault may autofill previously stored passwords.

Such password vaults may store a number and variety of passwords across many different accounts. Nonetheless, such conventional password vaults do not solve the problem of updating a user's passwords across the various accounts, so that an undesirable level of user involvement is still required. Moreover, if a user's password is stolen in a data breach, the stolen password may be used to access the user's account until, e.g., the account provider becomes aware of the data breach, alerts the user, and the user updates the stolen password (with or without use of the password vault).

Even if the account provider in question requires periodic password updates, and even if the user performs such updates, the account remains vulnerable for an entire time until such an update actually occurs. In many cases, moreover, an account provider may require a password update at a defined interval, but may have no way to enforce the required password update until a user actually attempts to log on to the account in question. Therefore, if a password reset is required every three months and the user fails to visit the website in question for longer than three months, then the user's account remains vulnerable following a data breach for even longer than the defined password reset window.

For the above and other reasons, it remains common for users to use a single (or very few) password(s) across many different websites, and to maintain passwords for long periods of time. Application and account providers store the resulting users' username and password data internally, and hackers and other illicit users frequently breach security measures and gain access to the username and password data.

As may be understood from the above description, these illicit users may then take the stolen username/password combinations (which may include login information for millions of users), and programmatically attempt to access millions of websites, e.g., in the types of credential stuffing cyberattacks referenced above. For example, a hacker may steal a user's username/password combination from an email provider, and then apply the stolen username/password across many different websites. If the user used the same combination for a banking website, then the hacker may eventually gain access to the user's bank account.

As referenced above, account providers may not be immediately aware that their data has been breached. Even after becoming aware, a provider may have little recourse but to advise their users to change their passwords, which many users may not do. As a result, large databases of stolen username/password combinations are available and likely contain many valid username/password combinations that could be used across many different websites.

Techniques described herein enable frequent, automatic, and dynamic updating, resetting, and securely storing passwords across a large number of accounts, with little or no impact on (and sometimes, with little improvement to) users' experiences. Described techniques prevent passwords from being used across multiple applications, without requiring a multi-user, central password store. Described techniques function even when website applications require two-factor authentication (2FA) for a successful login.

Consequently, even if or when a user's credentials are stolen, the user is much less likely to be exposed. Even if a user is exposed through password theft, the length of a duration of such exposure is likely to be much less than in conventional approaches.

Moreover, a user may not be sure whether such exposure has occurred, and/or the user may wish to be more cautious with respect to one account versus another. In these and other cases, described techniques provide the user with an ability to perform automated password updating and resetting across many different websites, at any time or on any schedule desired by the user.

As a result, account providers may experience reduced liability. Users may experience reductions in loss of confidential data. Third party providers (e.g., banks or credit card companies) may also avoid losses or reduce various loss mitigation strategies required in anticipation of successful credential stuffing and other cyberattacks. Ultimately, with adoption of described techniques, such credential stuffing and other cyberattacks may become less common, as the odds of their success are reduced.

Figure 1:
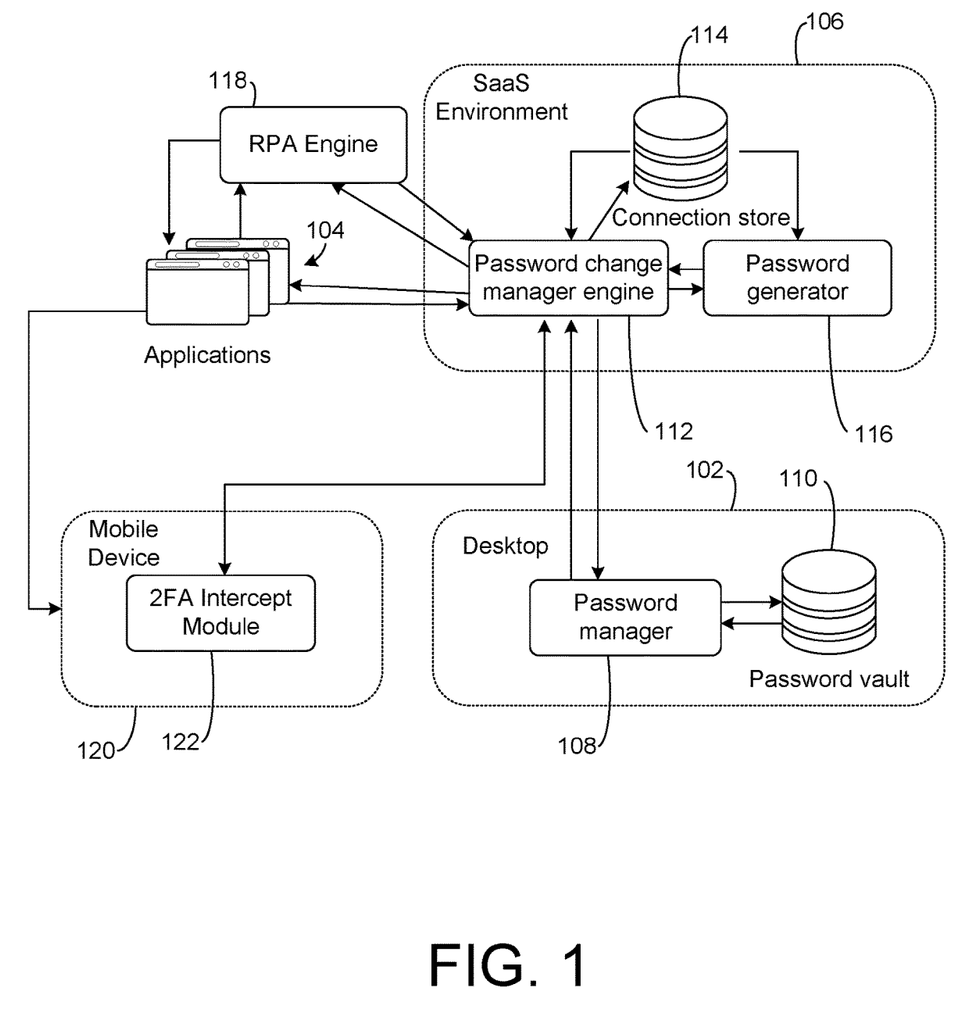
FIG. 1 is a block diagram of a system for automation of web application security.

FIG. 1 is a block diagram of a system for automation of web application security. In the example of FIG. 1, a desktop 102 represents any computing device that may be used by a user to access a plurality of websites or other applications 104.

For example, the desktop 102 may represent a personal, employer, school, or governmental computer. Such a computer may be understood to represent a laptop or tablet computer or may also represent a smartphone. The desktop 102 may represent any computing device capable of accessing the applications 104, including, for example, being capable of providing a browser or other application that may be used to enter username/password combinations required by the applications 104.

The applications 104 may provide access to any user account that may use such username/password combinations. Such user accounts may include, for example, bank accounts, email accounts, online shopping accounts, or any other type of online account.

Typically, the applications 104 may be operated by a provider that is responsible for maintaining username/password combinations of all of its users, even when a number of such users may be in the millions. That is, the provider must maintain the username/password combinations confidentially and securely, notwithstanding attempts by hackers and other illicit users to access the username/password combinations.

A software-as-a-service (SaaS) environment 106 represents an environment that is typically remote from the desktop 102 and the applications 104, and that facilitates interactions between the desktop 102 and the applications 104. For example, the SaaS environment 106 might be made accessible to the desktop 102 for the purposes of providing the automated password security techniques described herein.

Further in FIG. 1, the desktop 102 includes a password manager 108 and a password vault 110. The password vault 110 represents any suitable technique that may be used to provide secure, long-term storage of username/password combinations of the users of the desktop 102, for use in accessing the various applications 104. The password vault 110 may provide or enable various other features and functions, such as providing an auto-fill capability for filling in corresponding username/password credentials into the applications 104. For example, the password vault 110 may interface with a browser or other application (not shown) on the desktop 102.

In addition to interacting with the password vault 110 to provide passwords stored therein for use by the user of the desktop 102 when accessing corresponding accounts of the applications 104, the password manager 108 facilitates and enables periodic, automated, dynamic resetting or other updating of passwords stored using the password vault 110. For example, the password manager 108 may be configured to interact with a password change manager engine 112 of the SaaS environment 106 to ensure that changes made to passwords in the password vault 110 for a particular application correspond to changes made by the password change manager engine with respect to the corresponding application of the applications 104.

As described in detail below, in example implementations, the password manager 108 may be configured to detect or determine various password change triggers and may initiate subsequent password change procedures at the password change manager engine 112 in response to one or more such password change triggers.

For example, such password change triggers may include passage of a predetermined amount of time or other scheduling information. Password change triggers may also include a direct request(s) received from the user of the desktop 102 or may be based on detected actions of the user of the desktop 102 (e.g., visiting a specific website or type of website). In some cases, a password change trigger may include fulfilling a password update requirement of an application of the applications 104.

As referenced above, the password manager 108 may facilitate interactions between the password vault 110 and the password change management engine 112, while ensuring that the user's passwords are not stored in a centralized location with other passwords, but rather are stored securely in the user's local computing environment. That is, the password change manager engine 112 may be configured to provide centralized password resets, updates, or other management activities for many users, but is not required to provide long-term storage of username/password combinations for such users.

For example, the password change manager engine 112 may represent a SaaS web application that may be hosted on a cloud platform, or other suitable platform. As described in detail, below, users may use the password change manager engine 112 to register all applications (e.g., website applications), for which such users wish to periodically and dynamically change their passwords. The password change manager engine 112 may be further configured to interface or otherwise interact with the registered applications (e.g., the applications 104) to proactively implement such password changes.

A connection store 114 represents storage of all relevant password requirements (e.g., password length, content, or complexity), password change requirements and procedures, and any other password-related policies of the applications 104. The connection store 114 may also store information needed for interacting with each one of the applications 104 to implement password changes. All such information stored using the connection store 114 may cumulatively be referred to herein as a stored password model(s) for the application(s) 104.

Thus, upon determination of a password change trigger by the password manager 108, the password change manager engine 112 may be configured to receive a request for a password change for a particular application of the applications 104 from the password manager 108. The password change manager engine 112 may interface with the connection store 114 to determine relevant password change policies for the particular application.

A password generator 116 may be configured to generate requested passwords, using a relevant set of rules employed for password generation for a specific application of the applications 104, and also employing relevant algorithms that adhere to those set(s) of rules to provide valid passwords. As shown, the password generator 116 may be configured to interface with the connection store 114 to determine relevant rules and policies for generating a password for the specific application of the applications 104.

The password generator 116 may be hosted on a cloud platform, e.g., as a cloud native application, and may be configured to expose application program interfaces (APIs) for the password change manager engine 112 and the connection store 114 to use to interact with the password generator 116. Similarly, the password change manager engine 112 may be configured to host and expose APIs for the password generator 116, the connection store 114, and the password manager 108 to interact with the password change manager engine 112.

As referenced above, in addition to storing password models for the various applications, the connection store 114 may be configured to instruct the password change manager engine 112 with respect to how to interact with a specific application of the applications 104 to execute a desired password change. For example, for some of the applications 104, the password change manager engine 112 may be configured to interact directly by way of a suitable API to change a user's password (including, e.g., using a secure token to interact with the website in question).

In other examples, e.g., when such an API is not provided by a particular website or is otherwise unavailable, a robotic process automation (RPA) engine 118 may be utilized to interact with a chosen website to execute a desired password change. For example, the RPA tool 118 may be configured to script a designated website to enable point-and-click operations that mimic and implement user interactions with the website in question, such as buttons clicked, username(s) entered, or password(s) entered, which may be referred to screen-scraping operations.

Put another way, a website providing a suitable API may enable the password change manager engine 112 to programmatically change a user's password, e.g., without using a graphical user interface (GUI) of the website. Otherwise, the RPA engine 118 may be used to automatically perform the same types of point-and-click operations (or other interactions) that a user would perform when interacting with a GUI of the website (e.g., selecting a password field, entering the relevant password, and clicking a 'submit' button).

Further in FIG. 1, a mobile device 120 may sometimes be used or relied upon by some of the applications 104 to interact 2FA. In such 2FA schemes, for example, a randomly generated token (e.g., a random number of some designated length) may be sent to the user's registered mobile number or email account. In conventional systems, the user is then responsible for obtaining the 2FA code from the mobile device 120 and providing the 2FA code to the sending website or other application.

In FIG. 1, the password manager 108 and the password change manager engine 112 are configured to automatically reset, update, or otherwise modify a user's password for, e.g., a particular website application of the applications 104, in response to a password change trigger detected at the password manager 108, as described herein. In conjunction therewith and based on a corresponding password model stored using the connection store 114, the password change manager engine 112 may notify a 2FA intercept module 122, so that the 2FA intercept module 122 thereafter monitors the mobile device 120 (e.g., monitors an email account or messaging application thereof) to intercept a received 2FA code. In this way, the 2FA intercept module may then forward the 2FA code back to the password change manager engine 112. The password change manager engine 112 may then use the received 2FA code to proceed with processing the password reset/update of the corresponding password at the corresponding website application.

Thus, the system of FIG. 1 provides a de-centralized approach to resetting, updating, or otherwise modifying a user's passwords, on a regular basis or otherwise in response to a contextual password change trigger, and without requiring human involvement to do so. Consequently, if and when confidential data (including user credentials) of a website provider is breached by a hacker, the user will be assured of having different passwords in use across all registered websites (i.e., does not have any repeated or reused passwords).

Moreover, the specific password that was stolen may be updated much more quickly than using conventional techniques, even if the breach is not immediately recognized by the provider. If the breach is recognized by the provider, the user's relevant password(s) may be changed immediately and automatically in response thereto. In either case, the user's password may already be changed prior to the hacker even attempting to use the stolen password.

For example, the system of FIG. 1 may be configured to provide password updates once per week, or at any other desired interval. Additionally, or alternatively, the password manager 108 may be configured to detect when a user logs into a particular website or particular type of website, and then automatically perform a password reset in response to a password change requirement of the website.

During such operations, as described in detail below, initiation of communications between the password manager 108 and the password change manager engine 112 may be restricted to the password manager 108. In other words, although there may be two-way communication between the password manager 108 and the password change manager engine 112, the communication from the password change manager engine 112 to the password manager 108 may be restricted to being responsive to a communication initiated by the password manager 108. Therefore, the user environment of the desktop 102 maintains control and autonomy over the password change procedures described herein, and infiltrations of the user environment by illicit users may be avoided.

Figure 2:
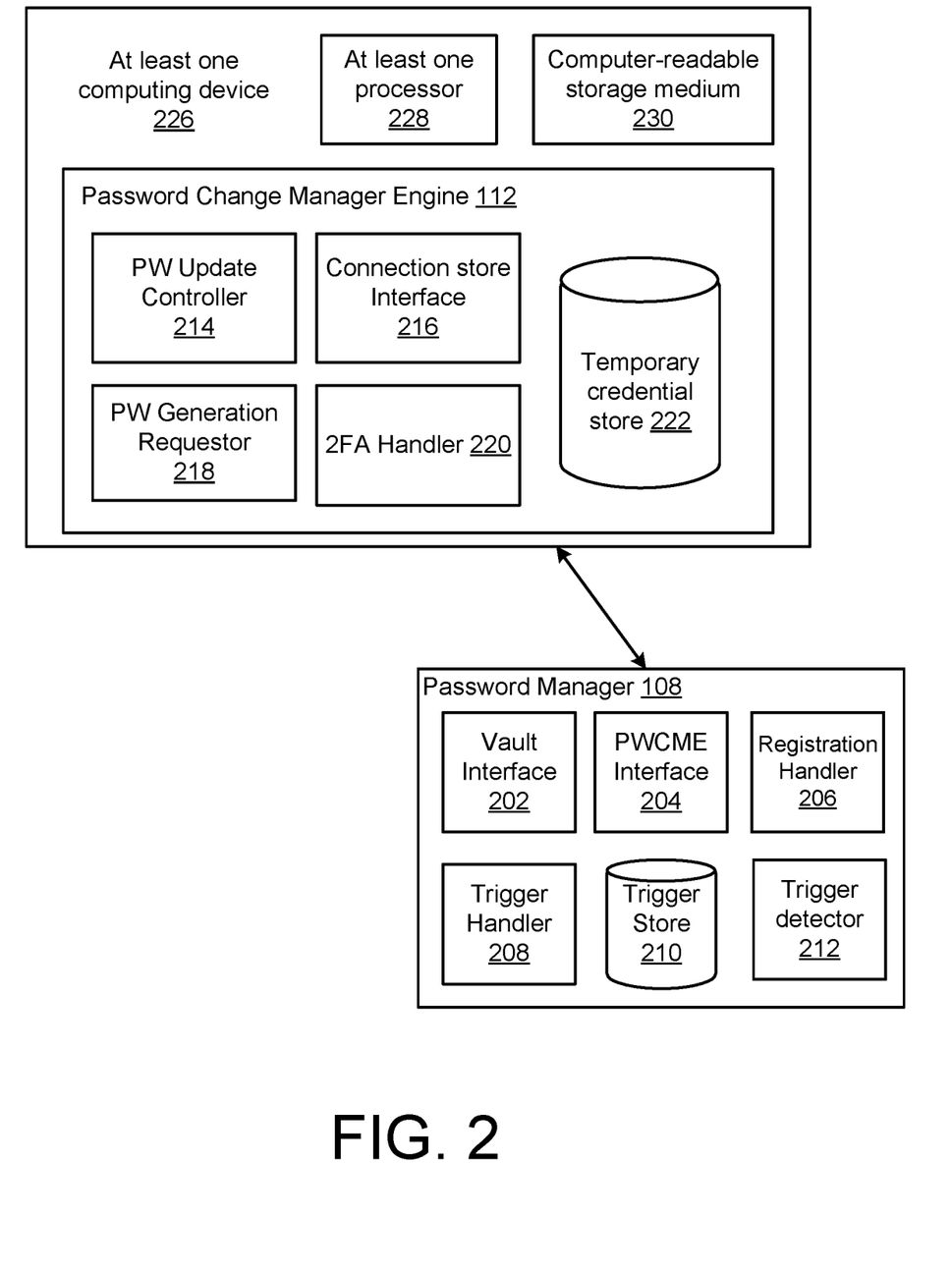
FIG. 2 is a block diagram illustrating more detailed example implementations of aspects of the system of FIG. 1.

FIG. 2 is a block diagram illustrating more detailed example implementations of aspects of the system of FIG. 1. More particularly, FIG. 2 illustrates additional example details regarding the password change manager engine 112 and the password manager 108.

As shown in FIG. 2, the password manager 108 may include a vault interface 202 that governs and implements interactions between the password manager 108 and the password vault 110. For example, the vault interface 202 may provide user-facing functions for enabling the user to configure the password vault 110 and/or configure interactions between the password manager 108 and the password vault 110.

Similarly, the password manager 108 may include a password change manager engine (PWCME) interface 204. The PWCME interface 204 may be configured to initiate communications with the password change manager engine 112, including initiating a password reset or update as described herein.

A registration handler 206 may allow the user to register any desired application of the applications 104. For example, a user may interact with the registration handler 206 to identify a particular website, along with any registration preferences (e.g., whether or not to use 2FA when such use is optional). Then, the PWCME interface 204 may provide the requested registration and registration preferences to the password change manager engine 112.

In conjunction with such registrations, and at any time thereafter, the user may interact with a trigger handler 208 to identify and configure desired password change triggers for the registered website(s). For example, the registration handler 206 and the trigger handler 208 may both provide suitable graphical user interface(s) designed to provide the user with options for website registration and associated password change trigger configurations.

For example, the user may identify a password change trigger based on time periods, time intervals, or specified calendar dates. For example, when registering a website with the registration handler 206, the user may specify that the password for the website will be updated once per week, once per month, or at any desired interval.

As referenced above, additional or alternative password change triggers may be specified as well. Advantageously, password change triggers may be defined for a single password, a group or type of password, or for all passwords of the user.

For example, password change triggers may include contextual events, such as visiting a particular website a designated number of times and/or with a designated frequency. In other examples, registration may include registering with a website to receive notifications of potential data breaches at the provider of the registered application.

All such password change triggers may be stored at a trigger store 210. For example, the trigger store 210 may store, for each application, group of applications, or for all registered applications, one or more corresponding password change triggers.

During operations of the password manager 108, a trigger detector 212 may access the trigger store 210 and then initiate corresponding password change operations with a corresponding application when a particular password change trigger is detected. For example, as described the password change trigger may include passage of a predetermined amount of time, or the reaching of a particular calendar date. As also referenced, if a potential breach occurs at a website provider and a corresponding notification is received, the trigger detector 212 may initiate the password change procedures described herein.

At the password change manager engine 112, a password update controller 214 may be configured to either utilize the RPA engine 118 to interact with a designated website or may use a predefined API and security token to perform website and/or application interactions. For example, the RPA engine 118 may be external to the SaaS environment 106, and the PW update controller 214 may be configured to provide external control of the RPA engine 118.

As referenced above, a connection store interface 216 may enable the password change manager engine 112 to interact with the connection store 114. For example, the connection store may be implemented as a data store within the SaaS environment 106. The connection store 114 may store information for thousands of websites or other applications, across many different users.

As previously noted, the connection store 114 may store, for each website or application, a corresponding password model that characterizes password requirements of the website or application, as well as password change procedures needed to implement the password requirements (e.g. to update a password correctly). The password model of a website may thus be generally applicable to all users of that website.

Each user, however, may have individual preferences or requirements with respect to performing password management using the password change manager engine 112. As described, the trigger handler 208, trigger store 210, and the trigger detector 212 may implement such individual preferences or requirements.

In some implementations, some functions of the trigger handler 208, trigger store 210, and the trigger detector 212 may be implemented at the password change manager engine 112. For example, when the trigger includes a defined interval (e.g., weekly) for password updates for a user with respect to a particular web site, the connection store 114 may store the password update trigger for the user. In other words, although the password manager 108 may be provided with an autonomy to control all aspects of initiating a password change procedure(s) as described herein, in some implementations, the password change manager engine 112 may be delegated to control some aspects of the related processes.

When in the process of updating or resetting an application's password, a password generation requestor 218 may be configured to request the password generator 116 to provide the new password. As described with respect to FIG. 1, the password generator 116 may be configured to interface with the connection store 114 to determine the relevant password model or may receive the password model from the connection store 114 via the password change manager engine 112.

When the password model mandates use of 2FA, a 2FA handler 220 may communicate with the 2FA intercept module 122 on the mobile device 120. That is, the 2FA handler 220 may provide the 2FA intercept module 122 with relevant interception criteria.

The interception criteria may include an identification of the application, a method by which the 2FA code will be shared (e.g., text or email), and a characterization of the 2FA code expected (e.g., a 6-digit number, or a 5-character alphanumeric code). The 2FA intercept module 122 may then implement the interception criteria at the mobile device 120 to obtain the expected 2FA code and forward the intercepted code to the 2FA handler 220 at the password change manager engine 112.

The password update controller 214 may then use the received 2FA code to interact with the application in question and update the corresponding password. For example, the password update controller 214 may instruct the RPA engine 118 to input the 2FA code, the old and previously-stored password (as obtained from the password manager 108 via the password vault 110), and the new and updated password into corresponding fields of the web site.

Once the password change manager engine 112 (specifically, the password update controller 214) has interacted with an application to update a password, a new password is obtained. The new password may be stored in a temporary credential store 222. Then, the password manager 108 (e.g., the PWCME interface 204) may request the new, updated password from the temporary credential store 222 after a predetermined quantity of time.

In this way, as noted above, the password manager 108 may maintain authority and autonomy in controlling the password change manager engine 112 and associated password update procedures. The password manager 108, e.g., the vault interface 202, may then update the new password within the password vault 110. Accordingly, the user may receive and begin to use a new password, without necessarily being aware of a specific content of the old password, the new password, or the fact that a password change has occurred.

FIG. 2 illustrates that the password change manager engine 112 may be implemented using at least one computing device 226. The at least one computing device 226 may further include at least one processor 228 and a non-transitory computer-readable storage medium 230. During operation, the at least one processor 228 may execute instructions stored using the non-transitory computer readable storage medium 230, in order to provide the various features and functions of the password change manager engine 112 described herein. For example, the at least one computing device 226 may be implemented as part of the SaaS environment 106.

Figure 3:
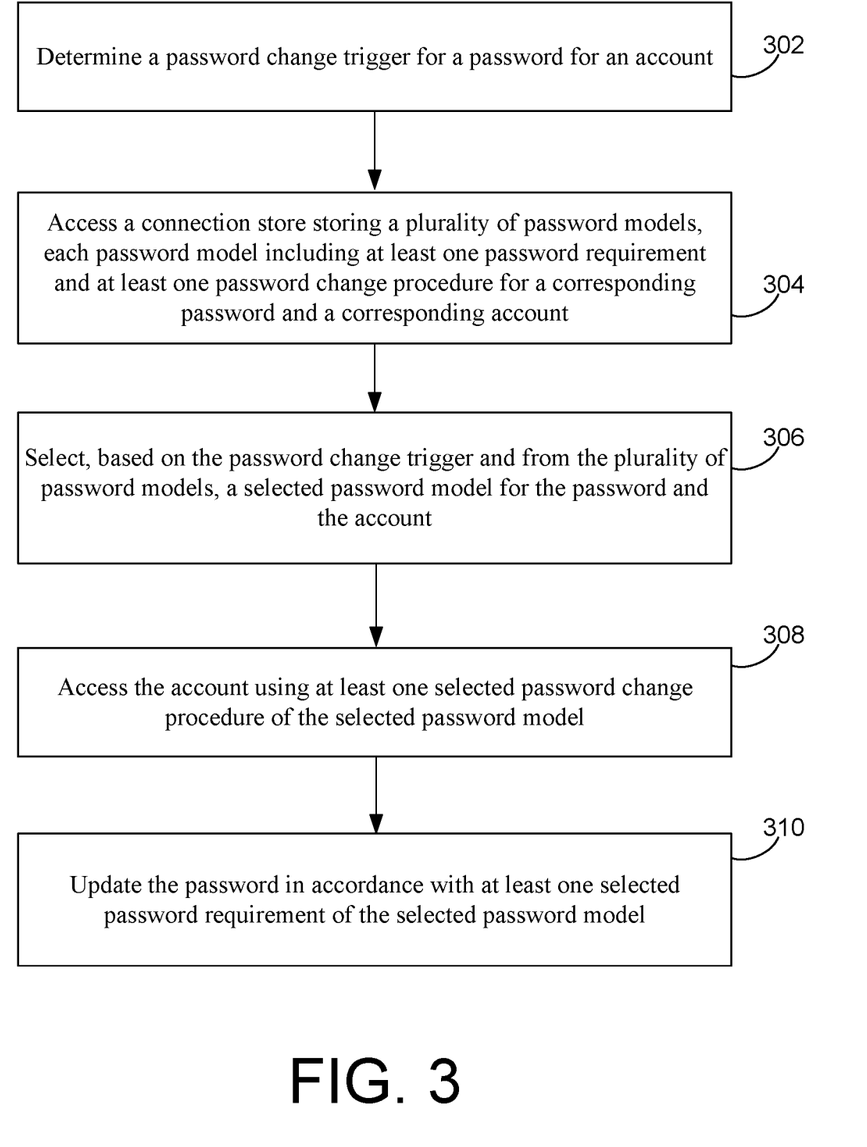
FIG. 3 is a flowchart illustrating example operations of the systems of FIGS. 1 and 2.

FIG. 3 is a flowchart illustrating example operations of the systems of FIGS. 1 and 2. In the example of FIG. 3, operations 302-310 are illustrated as separate, sequential operations. In various implementations, the operations 302-310 may include sub-operations, may be performed in a different order, may include alternative or additional operations, or may omit one or more operations. Further, in all such implementations, included operations may be performed in an iterative, looped, nested, or branched fashion.

In the example of FIG. 3, a password change trigger for a password for an account may be determined (302). For example, the trigger detector 212 of the password manager 108, which may alternatively be implemented partially or completely at the password change manager engine 112, may detect the password change trigger. As described, the password change trigger may include a designated passage of time (e.g., a scheduled time interval), a specified calendar date, a visit or interaction with a specific website or type of website, and/or a breach notification received from a registered website. The password change trigger may designate the related application and associated account with the password to be changed.

A connection store storing a plurality of password models may be accessed, each password model including at least one password requirement and at least one password change procedure for a corresponding password and a corresponding account (304). For example, the password manager 108, e.g., the PWCME interface 204, may notify the password change manager engine 112 that a password change procedure should be initiated.

As described, for example, the connection store 114 may store a plurality of password models, with a password model for each of the applications 104. The stored password requirements may specify a required length, complexity, and/or content of individual passwords. The stored password change procedures may specify a required interaction type (e.g., use of API/security token or of the RPA engine 118), as well as dictating whether and how a 2FA procedure(s) is required.

Based on the password change trigger, and from the plurality of password models, a selected password model for the password and the account may be selected (306). For example, the password change manager engine 112 may interface with the connection store 114 to retrieve a password model for the application and/or account designated within or by the password change trigger.

The account may be accessed using at least one selected password change procedure of the selected password model (308). For example, the password update controller 214 of the password change manager engine 112 may be configured to determine and implement the required type of interfacing with a designated application (e.g., API, token, or RPA engine 118). For example, the password update controller 214 may log into the user's account at a website.

The password is updated in accordance with at least one selected password requirement of the selected password model (310). For example, the password update controller 214 may receive an old or existing password of the user from the password manager 108, in conjunction with (e.g., included within) the received password change request. Then, the password update controller 214 (e.g., using the RPA engine 118) may proceed to enter the old or existing password and any relevant 2FA code into corresponding fields of the website. The password update controller 214 may then enter the new password, as generated by the password generator 116 in accordance with the password requirements of the selected password model, into a corresponding field(s) of the website.

Figure 4:
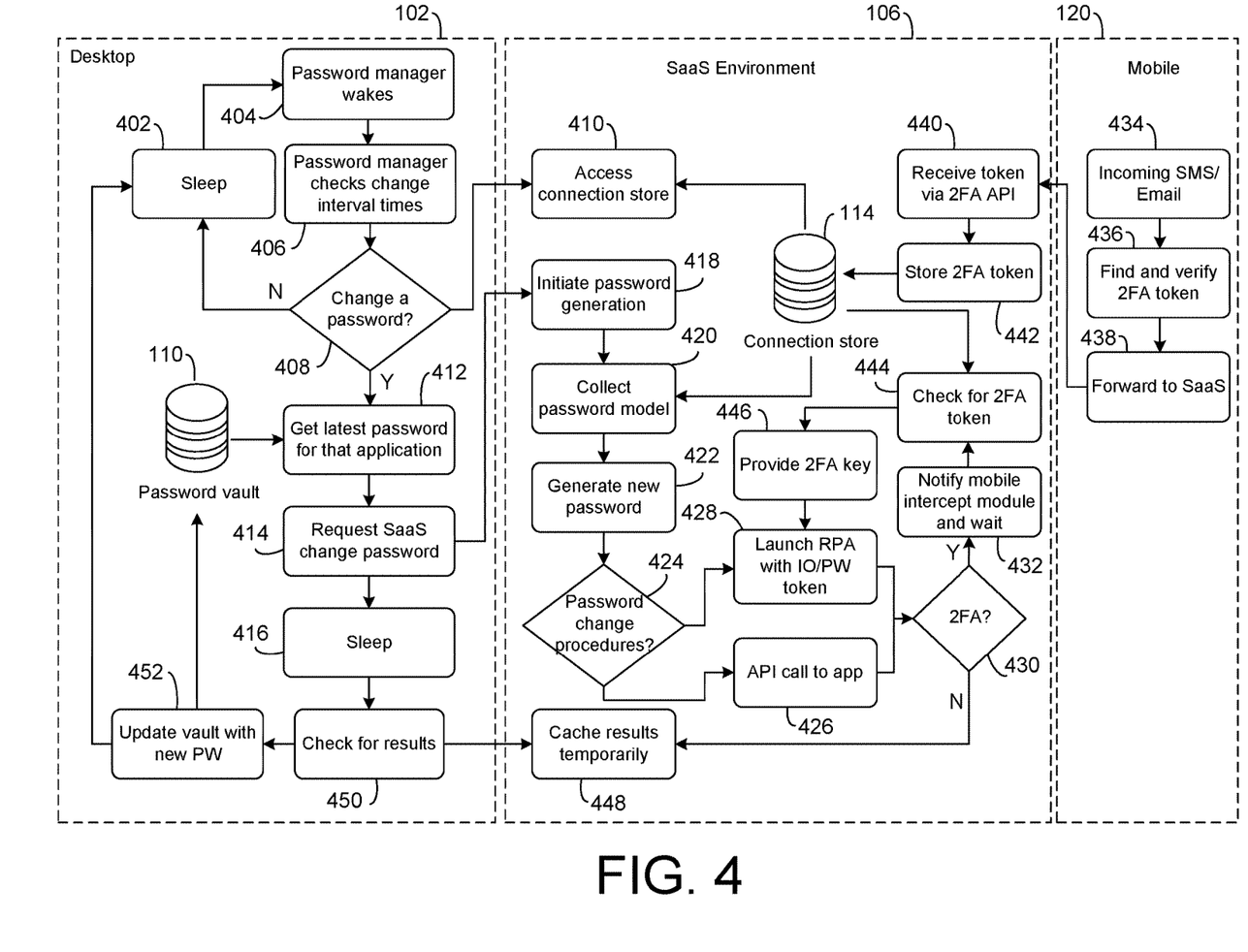
FIG. 4 is a flowchart illustrating more detailed example operations of the systems of FIGS. 1 and 2.

FIG. 4 is a flowchart illustrating more detailed example operations of the systems of FIGS. 1 and 2. As illustrated, FIG. 4 differentiates example operations of the desktop 102, the SaaS environment 106, and the mobile device 120.

In FIG. 4, the process begins with the password change manager 108 in a sleep mode (402). After a defined time interval (e.g., 8 hours, or any suitable time period, which may be set by a user), the password manager 108 wakes up (404) and determines whether any change interval times have been triggered (406). That is, in FIG. 4, the password change trigger may be assumed to be a defined time interval, e.g., received from the user. For example, the password manager 108 may manage passwords for 100 websites, and upon waking, may determine that 12 (or some other number) of these websites may have passwords that must be changed.

The password manager 108 may check with the SaaS environment 106 to determine whether a specific password change is required, allowed, and/or available (408). For example, the connection store 114 may be accessed (410) to determine whether the website in question prohibits the password change. For example, some websites may limit a number or frequency of password changes. In such cases, and if the password is the last or only password to be changed at this time interval, then the password manager 108 may return to sleep (402).

Otherwise, if the password must be changed (408), the password change manager engine 112 may specify or allow a particular website password update. For example, on the password change manager engine 112, where the user may have registered a list of all the applications/websites for which the user wants to periodically and dynamically change the password, the user may also specify a separate password change time interval for each application or website. Then, after every specified password change time interval, the password change process may be triggered for the respective application(s) or website(s). The user may be provided with complete flexibility to choose and set the password change time interval for each application or website at the password change manager engine 112, e.g., using a web application of the password change manager engine 112.

For example, for hypothetical website 'www.corp_example.com', password change manager engine web application may find that it is time to initiate the password change process for 'www.corp_example.com'. The password change manager engine 112 may thus provide that information to the password manager 108.

The password manager 108 may then obtain a current (old) password to be changed from the password vault 110 (412). For example, the password manager 108 may obtain the current username and password for 'www.corp_example.com' from the password vault 110.

The password manager 108 may then send a password change request to the password change manager engine 112 in the SaaS environment 106 (414), and then enter a sleep mode (416). For example, the password manager 108 may forward www.corp_example.com's current username and password to the password change manager engine 112.

The password change manager engine 112 may then initiate password generation at the password generator 116 (418). For example, the password change manager engine 112 may request the password generator 116 to generate a new password for 'www.corp_example.com'.

In response, the password generator 116 may collect or obtain the password model for the web site in question (420), e.g., the password model of www.corp_example.com, in the connection store 114. For example, the password model of 'www.corp_example.com' may mandate a password length of 8 to 20 characters, with uppercase and lowercase letters and at least two special characters. The password generator 116 may then uses the obtained password requirement information from the password model of www.corp_example.com to generate a new valid, random password for 'www.corp_example.com' (422), for use by the password change manager engine 112.

The password change manager engine 112 will then reach out to the connection store 114 to obtain password change procedures (424) for changing the password for 'www.corp_example.com'. As described, such password change procedures may be implemented, e.g., either directly via an API call to the web site or application (426), or using the RPA engine 118 (428).

If there is an API to change the password for 'www.corp_example.com', the connection store 114 may provide the password change manager engine 112 with information about the API and its location. Then, the password change manager engine 112 may directly reach out to 'www.corp_example.com', use the API to change the password, and provide the existing credentials and the new password. For example, 'www.corp_example.com' may reply to the password change manager engine 112 once the password has been successfully changed.

If the connection store 114 informs the password change manager engine 112 that there is no API to change the password of 'www.corp_example.com', then the connection store 114 may provide the password change manager engine 112 with an RPA script (the script number S1234, for example), as well as the method to call or execute the script. The password change manager engine 112 may then access the RPA engine's 118 script store and instruct the RPA engine 118 to execute the script numbered S1234. The password change manager engine 112 may provide the script S1234, the username, as well as the old and new passwords. The script S1234 may then execute to launch the 'www.corp_example.com' website, log in using the existing credentials (i.e., with the old password), and change the password. The RPA engine 118 may then reach out to the password change manager engine 112 and convey that the password change process has been accomplished successfully.

In addition to, or in conjunction with, the above, if the website in question, e.g., 'www.corp_example.com' uses two-factor authentication (430), then the connection store 114 may pass that information to the password change manager engine 112 and inform the password change manager engine 112 as to whether the randomly generated token of the 2FA as well as the required email address and SMS delivery address will be sent to the user's registered email address and/or mobile number.

Then, the password change manager engine 112 notifies the 2FA intercept module 122 and waits (432). That is, the password change manager engine 112 notifies the 2FA intercept module 122 that 'www.corp_example.com' uses 2FA, as well as whether the randomly generated token is to be sent to the user's registered email address and/or mobile number, so that the 2FA intercept module 122 knows the required email address and/or SMS delivery address to be tracked in order to trace the randomly generated token.

When the 2FA intercept module 434 receives the incoming SMS/email message (434), the 2FA intercept module finds and verifies inclusion of the 2FA token (436) and forwards it to the SaaS environment (106). Upon receipt thereof at a 2FA API (440), the password change manager engine 112 may then store the 2FA token (442) at the connection store 114.

After notifying the mobile intercept module and waiting the defined wait time (432), the password change manager engine 112 may check for the 2FA token (444) and provide the 2FA token (e.g., via the API or RPA engine as described above) to the application 104 for which the password is being changed (446).

Once the new password is obtained using one or more of the above techniques, the resulting new password may be cached temporarily at the password change manager engine 112, e.g., cached using the temporary credential store 222 (448). Once the password manager 108 checks for results (450) according to a predefined schedule, the password vault 110 may be updated with the new password (452), and the password manager 108 may return to sleep (402). For example, the password manager 108 may periodically ping the password change manager engine 112 until a 'Successful Acknowledgement' message is received from the password change manager engine 112.

Thus, the password change mechanisms described herein may occur automatically, without any user intervention or knowledge required. For example, if the 'www.corp_example.com' website was recently breached, the user is now no longer at risk. Moreover, if the 'www.corp_example.com' website was breached a day ago, the random password that the hacker had will not work for any other website.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive, at a Software as a Service (SaaS) environment from a user device, a password change trigger for a password for an account;

receive a current password stored at the user device for the account;

access a connection store at the SaaS environment storing a plurality of password models, each password model including at least one password requirement and at least one password change procedure;

select, based on the password change trigger and from the plurality of password models, a selected password model for the password and the account;

generate, at the SaaS environment, a new password in accordance with the selected password model;

access the account using at least one selected password change procedure of the selected password model; and update the password from the current password to the new password in accordance with at least one selected password requirement of the selected password model.

2. The computer program product of claim 1, wherein the instructions, when executed, are further configured to cause the at least one computing device to:

determine the password change trigger as including a scheduled time interval.

3. The computer program product of claim 1, wherein the instructions, when executed, are further configured to cause the at least one computing device to:

determine that the at least one password change procedure requires accessing an application providing the account using an application program interface (API);

access the application using the API; and update the password from the current password to the new password using the API.

4. The computer program product of claim 1, wherein the instructions, when executed, are further configured to cause the at least one computing device to:

determine that the at least one password change procedure requires accessing an application providing the account using a robotic process automation (RPA) engine;

access the application using the RPA engine; and update the password from the current password to the new password using the RPA engine.

5. The computer program product of claim 1, wherein the instructions, when executed, are further configured to cause the at least one computing device to:

store, temporarily, the new password at the SaaS environment;

receive, at the SaaS environment, a request from the user device for the new password; and provide the new password to the user device in response to the request.

6. The computer program product of claim 1, wherein the instructions, when executed, are further configured to cause the at least one computing device to:

determine that the at least one selected password change procedure requires a two-factor authentication (2FA) token to be sent to a mobile device;

notify a 2FA intercept module on the mobile device to intercept the 2FA token; and receive the 2FA token from the 2FA intercept module.

7. The computer program product of claim 6, wherein the instructions, when executed, are further configured to cause the at least one computing device to:

update the password including submitting the 2FA token to an application providing the account.

8. The computer program product of claim 1, wherein the instructions, when executed, are further configured to cause the at least one computing device to:

determine the password change trigger as including a notification of a data breach including the current password.

9. A computer-implemented method, the method comprising:

receiving, at a Software as a Service (SaaS) environment from a user device, a password change trigger for a password for an account;

receiving a current password stored at the user device for the account;

accessing a connection store at the SaaS environment storing a plurality of password models, each password model including at least one password requirement and at least one password change procedure;

selecting, based on the password change trigger and from the plurality of password models, a selected password model for the password and the account;

generating, at the SaaS environment, a new password in accordance with the selected password model;

accessing the account using at least one selected password change procedure of the selected password model; and updating the password from the current password to the new password in accordance with at least one selected password requirement of the selected password model.

10. The method of claim 9, further comprising:

determining that the at least one password change procedure requires accessing an application providing the account using an application program interface (API);

accessing the application using the API; and updating the password from the current password to the new password using the API.

11. The method of claim 9, further comprising:

determining that the at least one password change procedure requires accessing an application providing the account using a robotic process automation (RPA) engine;

accessing the application using the RPA engine; and updating the password from the current password to the new password using the RPA engine.

12. The method of claim 9, further comprising:

determining that the selected password change procedure requires a two-factor authentication (2FA) token to be sent to a mobile device;

notifying a 2FA intercept module on the mobile device to intercept the 2FA token;

receiving the 2FA token from the 2FA intercept module; and updating the password including submitting the 2FA token to an application providing the account.

13. The method of claim 9, further comprising:

determining the password change trigger as including a notification of a data breach including the current password.

14. A system comprising:

at least one memory including instructions; and at least one processor that is operably coupled to the at least one memory and that is arranged and configured to execute instructions that, when executed, cause the at least one processor to receive, at a Software as a Service (SaaS) environment from a user device, a password change trigger for a password for an account;

receive a current password stored at the user device for the account;

access a connection store at the SaaS environment storing a plurality of password models, each password model including at least one password requirement and at least one password change procedure;

select, based on the password change trigger and from the plurality of password models, a selected password model for the password and the account;

generate, at the SaaS environment, a new password in accordance with the selected password model;

access the account using at least one selected password change procedure of the selected password model; and update the password from the current password to the new password in accordance with at least one selected password requirement of the selected password model.

15. The system of claim 14, wherein the system is further configured to:

store, temporarily, the new password at the SaaS environment;

receive, at the SaaS environment, a request from the user device for the new password; and provide the new password to the user device in response to the request.

16. The system of claim 15, wherein the system is further configured to:

determine that the selected password change procedure requires a two-factor authentication (2FA) token to be sent to a mobile device;

notify a 2FA intercept module on the mobile device to intercept the 2FA token;

receive the 2FA token from the 2FA intercept module; and update the password including submitting the 2FA token to an application providing the account.

17. The system of claim 14, wherein the system is further configured to:

determine the password change trigger as including a notification of a data breach including the current password.

\* \* \* \* \*